US009521333B2

(12) United States Patent
Hozumi

(10) Patent No.: US 9,521,333 B2
(45) Date of Patent: Dec. 13, 2016

(54) IMAGING APPARATUS AND CONTROL METHOD OF IMAGING APPARATUS

(71) Applicant: CANON KABUSHIKI KAISHA, Tokyo (JP)

(72) Inventor: Yasushi Hozumi, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 14/461,823

(22) Filed: Aug. 18, 2014

(65) Prior Publication Data

US 2015/0054977 A1    Feb. 26, 2015

(30) Foreign Application Priority Data

Aug. 21, 2013    (JP) .................. 2013-171637

(51) Int. Cl.
*H04N 5/232* (2006.01)
*H04N 5/235* (2006.01)

(52) U.S. Cl.
CPC .......... *H04N 5/2355* (2013.01); *H04N 5/2353* (2013.01); *H04N 5/2354* (2013.01); *H04N 5/23222* (2013.01); *H04N 5/23293* (2013.01)

(58) Field of Classification Search
CPC . H04N 5/2355; H04N 5/2356; H04N 5/23293
USPC ...................................... 348/333.02
See application file for complete search history.

(56) References Cited

U.S. PATENT DOCUMENTS

2004/0169767 A1* 9/2004 Norita ................ H04N 5/23212
348/350

FOREIGN PATENT DOCUMENTS

JP    2000-92378 A    3/2000

* cited by examiner

*Primary Examiner* — Anthony J Daniels
(74) *Attorney, Agent, or Firm* — Canon U.S.A., Inc. IP Division

(57) ABSTRACT

An imaging apparatus including an imaging unit that obtains a plurality of photographed images of different photographing conditions includes a setting unit that sets photographing conditions of the imaging unit, an instruction unit that instructs photographing by the imaging unit, and a notification unit that notifies photographing conditions set by the setting unit before the instruction unit instructs the photographing, wherein the notification unit notifies, before the instruction unit instructs the photographing, only a photographing condition of a longest exposure time from among a plurality of photographing conditions for obtaining the plurality of photographed images or a sum of exposure times for obtaining the plurality of photographed images.

17 Claims, 5 Drawing Sheets

FIG. 3

|  | FIRST PHOTOGRAPHED IMAGE | SECOND PHOTOGRAPHED IMAGE | THIRD PHOTOGRAPHED IMAGE |
|---|---|---|---|
| FIRST EXEMPLARY EMBODIMENT | LIGHT FLASH, PERFORM EXPOSURE OF SHORT TIME T1 | NOT LIGHT FLASH, PERFORM EXPOSURE OF SHORT TIME T1 | NOT LIGHT FLASH, PERFORM EXPOSURE OF LONG TIME T2 |
| SECOND EXEMPLARY EMBODIMENT | NOT LIGHT FLASH, PERFORM EXPOSURE OF LONG TIME T2 | NOT LIGHT FLASH, PERFORM EXPOSURE OF SHORT TIME T1 | LIGHT FLASH, PERFORM EXPOSURE OF SHORT TIME T1 |

- WHEN SW1 IS ON, DISPLAY "2T1 + T2" ON EVF
- ADDITIONAL INFORMATION (E.G. SHUTTER SPEED AND ISO SENSITIVITY): EMPLOY PHOTOGRAPHING CONDITIONS OF WHEN PHOTOGRAPHING BY PERFORMING EXPOSURE OF LONG TIME T2

FIG. 4
| STARRY SKY-PORTRAIT PHOTOGRAPHING MODE | FIRST PHOTOGRAPHED IMAGE | SECOND PHOTOGRAPHED IMAGE | THIRD PHOTOGRAPHED IMAGE |
|---|---|---|---|
| | 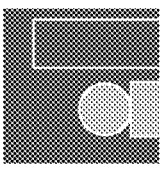 |  | 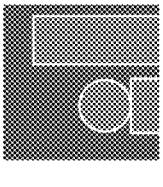 |
| | LIGHT FLASH, PERFORM EXPOSURE OF SHORT TIME T1 | NOT LIGHT FLASH, PERFORM EXPOSURE OF SHORT TIME T1 | NOT LIGHT FLASH, PERFORM EXPOSURE OF LONG TIME T2 |
WHEN SW1 IS ON, DISPLAY "T1" ON EVF

IMAGING APPARATUS AND CONTROL METHOD OF IMAGING APPARATUS

BACKGROUND

1. Field

Aspects of the present invention generally relate to an imaging apparatus which obtains one image by continuously capturing and combining a plurality of images, and a control method of the imaging apparatus.

2. Description of the Related Art

Japanese Patent Application Laid-Open NO. 2000-92378 discusses a technique for photographing an identical object employing a plurality of amounts of exposure. Image signals corresponding to a plurality of screens of different amounts of exposure are then combined, and a combined image having a high dynamic range (HDR) is generated. Further, Japanese Patent Application Laid-Open NO. 2000-92378 discusses a unit configured to display a ratio of the exposure amounts of the plurality of screens having different exposure amounts.

However, a user cannot intuitively recognize exposure time by viewing the generated combined image even if the ratio of the exposure amounts is displayed, so that usability is low.

SUMMARY OF THE INVENTION

According to an aspect of the present invention, an imaging apparatus including an imaging unit configured to obtain a plurality of photographed images of different photographing conditions includes a setting unit configured to set photographing conditions of the imaging unit, an instruction unit configured to instruct photographing by the imaging unit, and a notification unit configured to notify photographing conditions set by the setting unit before the instruction unit instructs the photographing, wherein the notification unit notifies, before the instruction unit instructs the photographing, only a photographing condition of a longest exposure time from among a plurality of photographing conditions for obtaining the plurality of photographed images.

Further features of the present disclosure will become apparent from the following description of exemplary embodiments with reference to the attached drawings.

BRIEF DESCRIPTION OF THE DRAWINGS

FIG. 4 illustrates the photographing conditions of the starry sky-portrait photographing mode.

DESCRIPTION OF THE EMBODIMENTS

Figure 1:
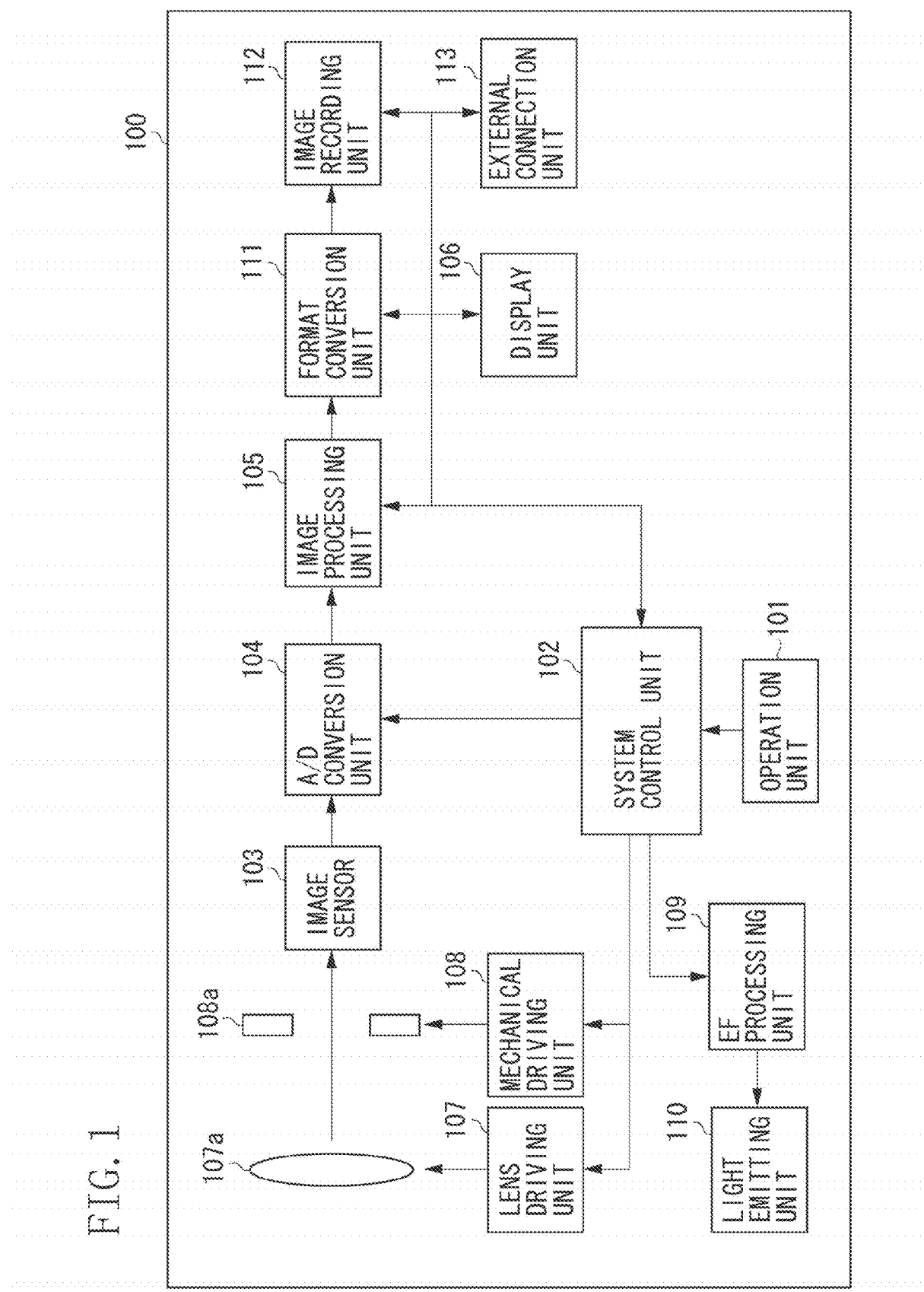
FIG. 1 is a block diagram illustrating a functional configuration of a digital camera according to a first exemplary embodiment.

Various exemplary embodiments will be described in detail below with reference to the drawings.

The present disclosure is directed to providing a user interface which indicates photographing conditions useful for photographing in an imaging apparatus that continuously captures a plurality of images of different exposures.

A first exemplary embodiment will be described below. FIG. 4 illustrates images photographed for generating an image finally output in the starry sky-portrait photographing mode. Referring to FIG. 4, there are three continuously-photographed images of different photographing conditions in the starry sky-portrait photographing mode. More specifically, a first image is photographed by firing a flash and setting a short exposure time T1. A second image is photographed without firing the flash and by setting the short exposure time T1. A third image is photographed without firing the flash and by setting a long exposure time T2.

The first image is obtained by photographing a main object such as a person under a photographing condition in which correct exposure is performed by firing a flash. Further, the third image is photographed under a photographing condition in which correct exposure is performed by not firing a flash in background photographing.

The second image is necessary for performing image processing for extracting only the main object (e.g., a person) from the first image. The second image is photographed basically under the same photographing condition as the first image except for a flash firing process.

The above-described three types of images are used for performing image processing. As a result, an image in which the main object and a background are both photographed by correct exposure can be obtained even if the background is extremely dark. An image failure in which there is overexposure of the main object is prevented.

However, the following problem occurs in the above-described photographing method (i.e., the starry sky-portrait photographing mode) for obtaining an image by performing image processing using the continuously photographed images of three photographing conditions.

An operation on a switch SW1 corresponds to instructing photographing preparation. While the user is operating on the SW1, a shutter speed (i.e., the exposure time) and an F-value obtained according to automatic exposure (AE) processing are displayed on a screen such as an electronic view finder (EVF). The user can then refer to the display and recognize the photographing conditions. Further, in some cases, the user may change the photographing conditions, so that the user can photograph under desirable conditions.

In the case of photographing in the starry sky-portrait photographing mode using the above-described camera operation system, the photographing conditions are displayed as in the case of normal continuous photographing. More specifically, when the user operates on the SW1, the shutter speed (T1 illustrated in FIG. 4) of the first photographed image among the three continuously photographed images is displayed.

On the other hand, an exposure time corresponding to the three continuously photographed images is necessary in photographing in the starry sky-portrait photographing mode as illustrated in FIG. 4. However, the user refers to the time T1 (i.e., the shutter speed of the first photographed image) which is displayed when operating on the SW1 and which is shorter than the exposure time corresponding to the three continuously photographed images. The user may thus obtain a blurred image by moving the camera or the object before photographing ends. According to the present exemplary embodiment, when photographing in a mode such as the starry sky-portrait mode in which the exposure time corresponding to the plurality of images is required to be employed, either of the following is displayed. The photographing condition in which the exposure time is longest and which is employed for photographing the starry sky at correct exposure is displayed before instructing photographing of the plurality of images. Further, the time necessary for performing one photographing, i.e., the sum of the exposure times in which the plurality of images are photographed, is displayed before instructing photographing of the plurality of images.

FIG. 1 is a block diagram illustrating the functional configuration of a digital camera 100 which is an example of the imaging apparatus according to the present exemplary embodiment. According to the present exemplary embodiment, the digital camera 100 includes functions of capturing a still image and a moving image with respect to the object.

Referring to FIG. 1, an operation unit 101 is a user interface for the user to input and set various commands to the digital camera 100. For example, the operation unit 101 includes mechanical switches and buttons having the functions of various command settings as an input device. Further, the operation unit 101 may be a display device such as a touch-panel liquid crystal on which buttons having the similar functions are formed and displayed. The operation unit 101 is used for turning the power on/off, setting and changing the photographing conditions, confirming the photographing conditions, and confirming the photographed image.

Furthermore, the operation unit 101 includes a shutter switch. If the shutter switch is half-pressed, it indicates that the first shutter switch SW1 is operated on for instructing photographing preparation. If the shutter switch is fully-pressed, it indicates that a second shutter switch SW2 is operated to instruct main photographing (i.e., still-image photographing). A system control unit 102 is then notified of the respective instructions.

Upon receiving the notification of the SW1, the system control unit 102 is instructed to start calculating or setting photographing conditions for performing auto focus (AF) processing and AE processing to be described below. Further, upon receiving the notification of the SW2, the system control unit 102 is instructed to start a series of photographing operations. The series of photographing operations includes reading an image signal from an image sensor 103, performing analog/digital (A/D) conversion, performing image processing on converted data, converting processed data to an arbitrary recording format, and writing image data to an image recording unit 112.

The system control unit 102 controls the operations of each unit in the digital camera 100 according to an instruction from the operation unit 101. In general, the system control unit 102 includes a central processing unit (CPU), a read-only memory (ROM) which stores programs to be executed by the CPU, and a random access memory (RAM) used for reading the programs and a work area.

The system control unit 102 performs AE processing. More specifically, the system control unit 102 calculates an object luminance level from digital image data output from an image processing unit 105 and automatically determines at least one of a shutter speed and a diaphragm according to photographing modes.

An exposure mechanism 108a includes the functions of the diaphragm and a mechanical shutter. A mechanical driving unit 108 receives notification of the above-described AE processing result from the system control unit 102 and performs control to operate the exposure mechanism 108a according to the received diaphragm and shutter speed. An optical path between a lens optical system 107a and the image sensor 103 and a light amount can thus be obtained. As a result, the object can be exposed on the image sensor 103 according to an exposure condition determined by performing AE processing.

Further, the system control unit 102 uses a lens driving unit 107 and drives a focus lens in the lens optical system 107a. The system control unit 102 then detects a change in contrast of the digital image data output from the image processing unit 105, and performs AF processing based on the detected change.

Furthermore, according to the present exemplary embodiment, the operation unit 101 includes a zoom lever for performing a zoom function. The system control unit 102 is thus notified of a signal instructing a predetermined displacement of the zoom lens in the lens optical system 107a to a zoom position according to movement of the zoom lever. The system control unit 102 then uses the lens driving unit 107 and moves the zoom lens in the lens optical system 107a to the desired zoom position based on the signal. The system control 102 controls the lens optical system 107a as described above so that photographing can be performed by arranging the lens in the desired zoom position.

Further, the system control unit 102 notifies the A/D conversion unit 104 of a gain adjustment amount according to set International Organization for Standardization (ISO) sensitivity. The set ISO sensitivity may be fixed sensitivity set by the user, or may be dynamically set by the system control unit 102 based on the result of performing AE processing. Setting of the ISO sensitivity will be described below.

Furthermore, the system control unit 102 sets a light emitting unit 110, and determines, based on the shutter speed determined according to the AE processing result and the photographing mode, whether it is necessary for the light emitting unit 110 to emit light when performing main photographing. For example, the light emitting unit 110 is a xenon tube or a light emitting diode. If the system control unit 102 determines to fire a flash in the light emitting unit 110, the system control unit 102 instructs an EF processing unit 109 to fire the flash. Upon receiving the instruction to fire the flash, the EF processing unit 109 controls the light emitting unit 110 and causes the light emitting unit 110 to emit light at timing the shutter of the exposure mechanism 108 is opened.

The image sensor 103 is a photoelectric conversion device such as a charge coupled device (CCD) sensor or a complementary metal-oxide semiconductor (CMOS) sensor. The image sensor 103 converts an optical image of the object formed via the lens optical system 107a and the exposure mechanism 108a to an analog electric signal for each pixel (i.e., analog image data).

The A/D conversion unit 104 performs correlated double sampling, gain adjustment, and A/D conversion on the analog image data output from the image sensor 103 and outputs the digital image data. The system control unit 102 notifies the A/D conversion 104 of a gain adjustment amount (i.e., amplification factor) to be applied. If a large gain is set, a signal level becomes high. However, a noise component included in the image also increases. According to the present exemplary embodiment, the gain setting is changed according to the ISO sensitivity setting, which will be described in detail below.

The image processing unit 105 performs various types of image processing on the digital image data output from the A/D conversion unit 104. For example, the image processing unit 105 performs white-balance correction, edge enhancement, noise reduction, pixel interpolation, gamma correction, and color difference signal generation. The image processing unit 105 outputs luminance (Y)-color difference (UV) image data as the processed digital image data.

Further, the image processing unit 105 performs image processing corresponding to each type of photographing modes. According to the present exemplary embodiment, the starry sky-portrait photographing mode is one of photographing modes, which will be described in detail below.

A display unit 106 includes a display medium such as a liquid crystal display (LCD) and displays an image obtained by the image processing unit 105 performing D/A conversion (not illustrated) on the processed digital image data.

Further, the display unit 106 displays the photographing mode set to the camera, and the photographing conditions such as the shutter speed and the ISO sensitivity when performing imaging while the user is holding the shutter switch SW1. Displaying of the photographing conditions while the user is holding the shutter switch SW1 in the starry sky-portrait photographing mode according to the present exemplary embodiment will be described below.

A format conversion unit 111 generates a data file to be used for recording with respect to the digital image data output from the image processing unit 105. For example, the format conversion unit 111 generates the data file complying with Design rule for Camera File system (DCF). When generating the data file, the format conversion unit 111 encodes the data in a joint photographic experts group (JPEG) format or a motion JPEG format and generates a file header.

An image recording unit 112 records the data file generated by the format conversion unit 111 in a built-in memory of the digital camera 100 or removable media attached to the digital camera 100.

An external connection unit 113 is an interface for connecting the digital camera 100 to an external device such as a personal computer (PC) or a printer. The external connection unit 113 receives the image data by communicating with the external device by complying with a general standard such as universal serial bus (USB) or Institute of Electrical and Electronic Engineers (IEEE) 1394, and uses the functions of each external device.

The operation of the digital camera 100 will be described below with reference to FIG. 1 and the flowchart illustrated in FIG. 2A.

When the user turns on a power switch (not illustrated) included in the operation unit 101, the system control unit 102 detects that the power switch has been turned on. The system control unit 102 then supplies power to each unit in the digital camera 100 from a battery or an alternating current (AC) input (not illustrated).

According to the present exemplary embodiment, when the power is supplied to the digital camera 100, the digital camera 100 starts an EVF display operation. More specifically, in step S1 illustrated in the flowchart of FIG. 2A, when the power is supplied, the mechanical shutter disposed in the exposure mechanism 108*a* is opened, and the exposure mechanism 108*a* exposes the image sensor 103. A charge stored in each pixel of the image sensor 103 is then sequentially read at a predetermined frame rate and is output to the A/D conversion unit 104 as the analog image data. According to the present exemplary embodiment, an image to be displayed on the EVF is thus obtained by sequentially reading the charge at the predetermined frame rate, i.e., by continuously performing imaging using an electronic shutter.

As described above, the A/D conversion unit 104 performs correlated double sampling, gain adjustment, and A/D conversion on the analog image data output from the image sensor 103, and outputs the digital image data. The gain adjustment will be described below.

The output signal level of the analog electric signal output from the image sensor 103 changes according to the exposure amount. If the object is bright, the exposure amount increases so that the output signal level also becomes high. On the other hand, since the exposure amount decreases in the case of the dark object, the output signal level also becomes low. If such an analog electric signal in which there is level fluctuation is input to the A/D conversion unit 104, and the digital electric signal is output without performing the gain adjustment, the level fluctuation is also generated in the output digital electric signal.

In contrast to this, the following gain is generally set to the digital camera. The gain which maintains the output signal level of the digital electric signal from the A/D conversion unit 104 constant regardless of the brightness of the object (i.e., the output signal level of the analog electric signal) is set according to the brightness of the object.

More specifically, the gain changes and is adjusted according to the setting of the ISO sensitivity which is one of the photographing conditions. In other words, a higher gain is set in the case where the ISO sensitivity is high when the object is dark as compared to the case where the ISO sensitivity is low when the object is bright. As a result, the noise component also increases due to an amplifying effect by the high gain in the case of high ISO sensitivity.

The ISO sensitivity set in relation to the gain setting performed by the A/D conversion unit 104 as described above may be fixed ISO sensitivity set by the user or may be dynamically set by the system control unit 102 based on the result of performing AE processing.

The image processing unit 105 performs various processes on the digital image data output from the A/D conversion unit 104 and outputs the processed digital image data such as YUV image data.

Further, the display unit 106 uses the digital image data output from the image processing unit 105 and sequentially displays images obtained by performing D/A processing (not illustrated).

In step S2, the system control unit 102 determines whether the notification of the SW1 has been received from the operation unit 101. If the system control unit 102 has not received the notification of the SW1 from the operation unit 101 (NO in step S2), the system control unit 102 repeats the above-described EVF display process.

If the system control unit 102 receives the notification of the SW1 from the operation unit 101 (YES in step S2), the process proceeds to step S3. In step S3, the system control unit 102 performs AF processing and AE processing using the latest photographed image of when the notification has been received. The system control unit 102 then determines and sets as the photographing conditions a focusing position and the exposure condition. According to the present exemplary embodiment, a plurality of images is continuously photographed, so that the photographing conditions appropriate for each photographing are determined and set.

Further, in step S3, the system control unit 102 determines whether it is necessary for the light emitting unit 110 to emit light (i.e., to perform EF processing). Whether the flash is to be fired may be previously set by the user using the operation unit 101, set according to reception of the above-described AE processing result, or be automatically determined and set by detecting the darkness of the surroundings.

In step S4, the system control unit 102 displays on the display unit 106 photographing conditions according to a photographing instruction issued by the user operating on the SW2 set in step S3. According to the present exemplary embodiment, the photographing conditions are displayed as follows. In a normal photographing mode, the exposure time for photographing one image is displayed. In the starry sky-portrait photographing mode in which a plurality of images is continuously photographed, the exposure time of the photographed image having the longest exposure time is displayed, or the sum of the respective exposure times which corresponds to the time necessary for photographing the plurality of images is displayed.

In step S5, the system control unit 102 determines whether the notification of the SW2 (i.e., a notification of the second shutter switch or full-pressing of the switch) has been received from the operation unit 101. If the system control unit 102 has not received the notification of the SW2 from the operation unit 101 (NO in step S5), the system control unit 102 stands by without performing the photographing operation while the system control unit 102 continues to receive the notification of the SW1 from the operation unit 101. On the other hand, if the system control unit 102 stops receiving the notification of the SW1 from the operation unit 101 before receiving the notification of the SW2, the system control unit 102 cancels fixed photographing conditions and operates to restart performing display control of the EVF.

If the system control unit 102 receives the notification of the SW2 from the operation unit 101 (YES in step S5), the system control unit 102 performs as follows. If the light emitting unit 110 is to emit light, the system control unit 102 controls the EF processing unit 109 to cause the light emitting unit 110 to perform pre-flash, calculates a light-emitting amount, and weights an EF frame. The system control unit 102 then instructs the EF processing unit 109 to cause the light emitting unit 110 to emit light by the calculated light-emitting amount, and shifts to the main photographing process. Further, if the light emitting unit 110 is not to emit light, the system control unit 102 does not perform the above-described light adjustment control and shifts to the main photographing process.

In step S6, the system control unit 102 performs the main photographing process after receiving the notification of the SW2. The system control unit 102 thus forms the optical image of the object on the image sensor 103 and exposes the image sensor 103 according to the photographing conditions obtained by performing AF processing and AE processing, and EF processing depending on conditions, when the SW1 has been operated. The A/D conversion unit 104 then converts the analog electrical signal for each pixel received from the image sensor 103 to the digital image data. In step S7, the image processing unit 105 performs image processing including the combining processing to be described below on the digital image data obtained in step S6. In step S8, the format conversion unit 111 converts the image-processed digital image data to the data file format for recording, and the image recording unit 112 records the converted data on a recording medium. Further, the system control unit 102 displays the image based on the corresponding image data on the display unit 106 at the same time as or after the data has been recorded.

The configuration of the digital camera and the basic photographing operation performed by the digital camera according to the present exemplary embodiment has been described above.

The flow of image processing and the image generated in each module when photographing in the starry sky-portrait photographing mode according to the present exemplary embodiment will be described below in detail with reference to FIG. 2B. The process illustrated in FIG. 2B is performed when photographing in the starry sky-portrait photographing mode in step S6 and step S7 of the flowchart illustrated in FIG. 2A according to the instruction from the system control unit 102.

Figure 3:
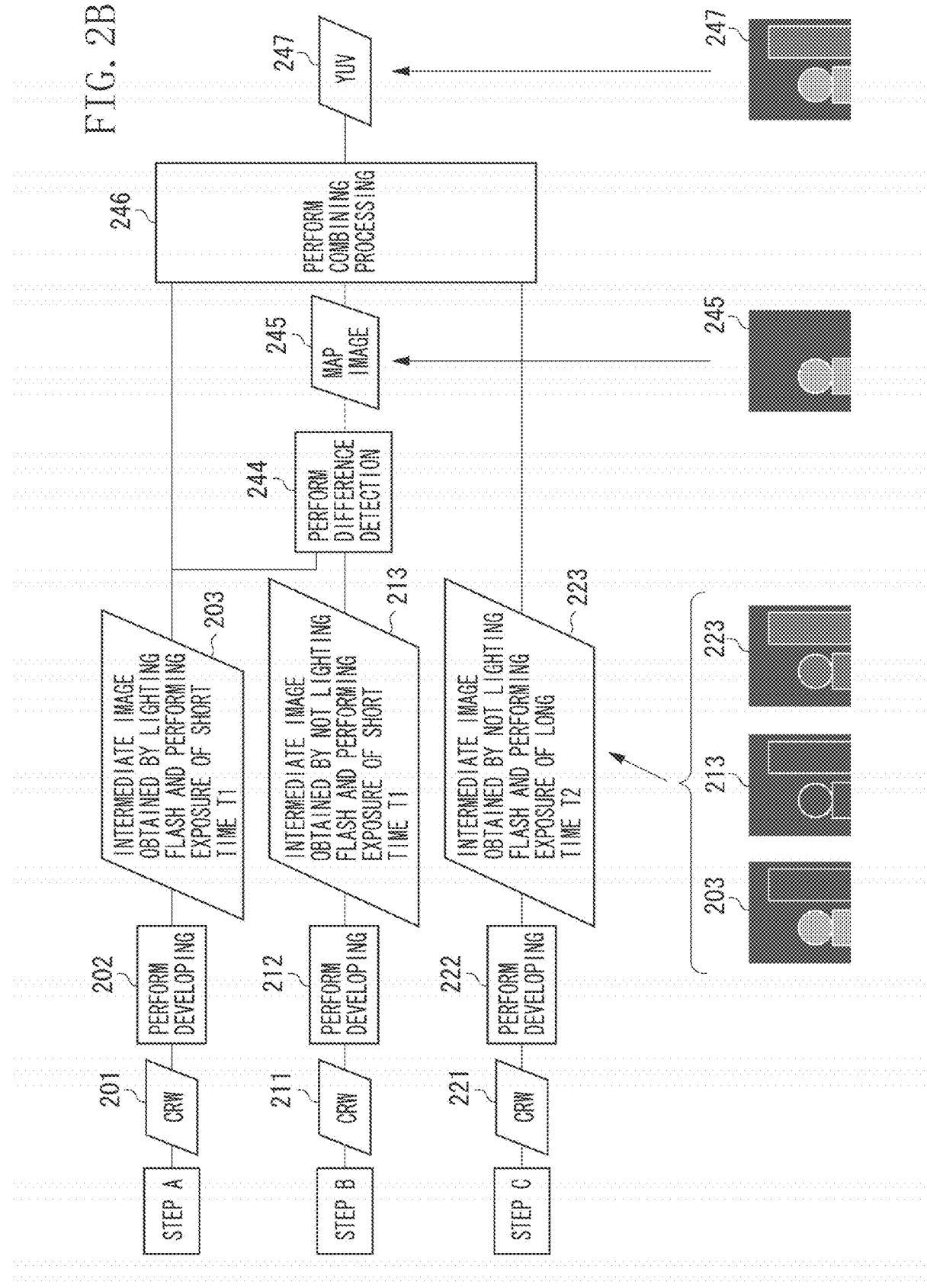
FIG. 3 illustrates the photographing conditions of the starry sky-portrait photographing mode according to first and second exemplary embodiments.

Further, FIG. 3 illustrates the respective photographing conditions and a photographing order of photographed images according to the present exemplary embodiment and a second exemplary embodiment to be described below. Referring to FIG. 3, an "exemplary embodiment 1" row indicates the photographing order in the starry sky-portrait photographing mode and the photographing conditions (i.e., whether to fire the flash and the exposure time (shutter speed)) characteristic of the starry sky-portrait photographing mode according to the present exemplary embodiment.

Figure 2:
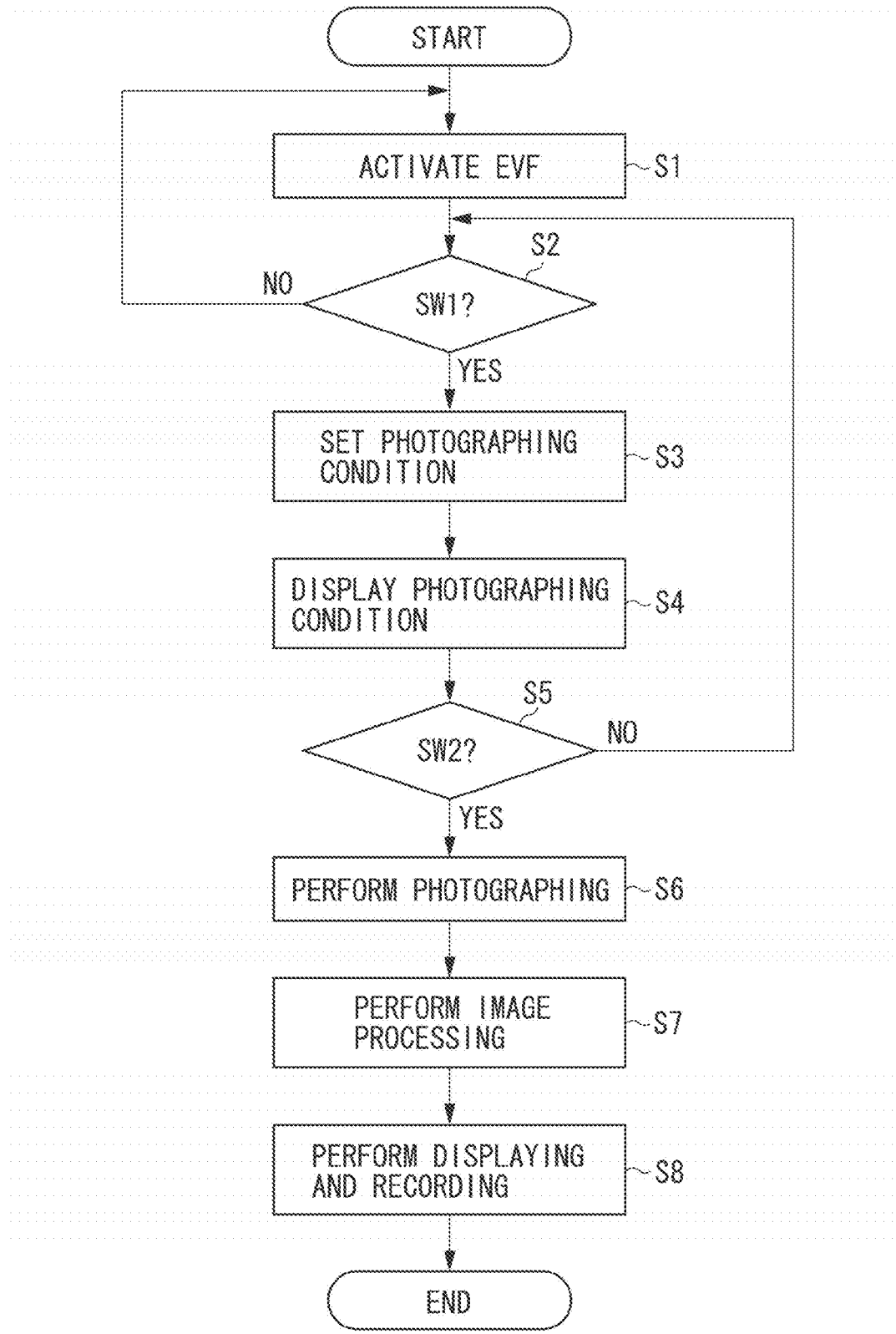
FIG. 2A is a flowchart illustrating an operation performed by the digital camera.
FIG. 2B is a flowchart illustrating image processing performed in a starry sky-portrait photographing mode according to the first exemplary embodiment.

Referring to FIG. 2B, the first photographed image in the starry sky-portrait photographing mode is obtained by firing the flash and performing imaging employing the exposure time T1 (hereinafter, such a step will be referred to as "step A"). The second photographed image is obtained without firing the flash and by performing imaging employing the exposure time T1 (hereinafter, such a step will be referred to as "step B"). The third photographed image is obtained without firing the flash and by performing imaging employing the exposure time T2 (hereinafter, such a step will be referred to as "step C").

The exposure time T1 employed in step A and step B of the starry sky-portrait photographing mode is the exposure time appropriate for the state in which the flash is fired with respect to the main object such as a person, and corresponds to short-time exposure. On the other hand, the exposure time T2 employed in step C is the exposure time appropriate with respect to the dark object such as a starry sky-night view, and corresponds to long-time exposure. As a result, the relation between the exposure time T1 and the exposure time T2 in the starry sky-portrait photographing mode is T1<T2.

A Canon Raw (CRW) 201 is obtained by photographing performed according to step A, and a developing module 202 then develops the CRW 201, so that an intermediate image 203 formed of the YUV image data is obtained. The developing process performed by the developing module 202 is normal image processing such as white-balance correction, edge enhancement, noise reduction, pixel interpolation, gamma correction, and color difference signal generation.

A CRW 211 is similarly obtained by photographing performed according to step B, and a developing module 212 then develops the CRW 211, so that an intermediate image 213 formed of the YUV image data is obtained. Further, a CRW 221 is similarly obtained by photographing performed according to step C, and a developing module 222 then develops the CRW 221, so that an intermediate image 223 formed of the YUV image data is obtained. Three types of CRWs are thus obtained.

A difference detection module 244 then obtains a map image 245 using the intermediate image 203 obtained in step A and the intermediate image 213 obtained in step B. Since only a portion of the object which has reflected the flashed light that is received by the image sensor 103 in photographing performed according to step A is displayed in the map image 245, the background is hardly displayed. The map is thus mainly formed of the main object.

A combining processing module 246 performs combining using the intermediate image 203 obtained in step A and the intermediate image 223 obtained in step C. More specifically, the image of the correct exposure (mainly the main object) in the intermediate image 203 is extracted from the result of the map image 245. The combining processing module 246 then combines the extracted image and the intermediate image 223, and obtains a final image (i.e., the processed image) YUV 247. In other words, the image in which the main object and the starry sky-night view are appropriately exposed can be obtained.

The format conversion unit 111 converts the obtained final image YUV 247 to data file format for recording such as JPEG, and the image recording unit 112 records the data in the recording medium. In such a case, information on the photographing conditions is added to the final image (i.e., processed image) and recorded on the recording medium. According to the present exemplary embodiment, the photographing conditions of step C in which the exposure time is the longest is used as supplementary information when photographing in the starry sky-portrait photographing mode. As a result, the user can recognize the exposure conditions (e.g., the shutter speed, an F-value, and the ISO sensitivity) of step C when photographing in the starry sky-portrait photographing mode. The information is thus useful when the user desires to photograph only the starry sky-night view. Further, the other photographing conditions of images used in generating the final image may also be added if as other objectives, the user desires, for example, to later refer to the photographing conditions appropriate for photographing a person.

As described above, according to the present exemplary embodiment, if the display unit 106 is to display the exposure time (i.e., the shutter speed) and the F-value to be used in photographing before a photographing instruction is issued, the display unit 106 displays the sum of the exposure times for photographing the first to the third image, i.e., 2T1+T2. The display unit 106 may instead display the longest exposure time T2 among the plurality of photographed images. As a result, the user can obtain the information which is closer to the time actually necessary for continuously photographing the images as compared to when the exposure time for photographing an optional one image is displayed. It thus reduces the failures which occur if the user moves the camera before photographing ends (the time for capturing three images is actually necessary), so that the user obtains a blurred image. Further, since the exposure time necessary for appropriately photographing the starry sky is displayed in the starry sky-portrait photographing mode, the user can photograph while confirming the exposure time appropriate for photographing the starry sky which is most significant in the present mode.

The above-described starry sky-portrait photographing mode is not seen to be limiting. Additional modes, such as a photographing mode in which a predetermined number of images is continuously obtained and combined (e.g., bracket photographing and photographing for HDR combining) are applicable.

According to the present exemplary embodiment, the supplementary information including the photographing conditions is recorded on the recording medium along with the image information. In particular, the supplementary information includes the photographing conditions of step A appropriate for photographing a person and the photographing conditions of step C appropriate for photographing the starry sky. As a result, the user can refer to the supplementary information when separately photographing only the person or only the starry sky-night view, so that the supplementary information is useful for the user.

Further, according to the present exemplary embodiment, three images are photographed, including the image photographed by the light emitting unit emitting light, in the starry sky-portrait photographing mode in which a person is appropriately photographed along with the starry sky. Another embodiment is applicable to, a method for appropriately photographing both the starry sky and the other object such as a building. In such a photographing method, the first image is photographed employing the exposure time T1 for photographing the object other than the starry sky at an appropriate brightness. The starry sky is then photographed employing the exposure time T2 (T1<T2) at the appropriate brightness. The combined image is thus generated by using mainly the image of the exposure time T1 for the starry sky area and the image of the exposure time T2 for other areas. In such a case, if the sum of the exposure times i.e., T1+T2, or the long and dominant exposure time T2 is displayed on the display unit 106 before receiving the photographing instruction, the user can obtain the information which is closer to the time actually necessary for photographing the two images. This is similar to photographing in the starry sky-portrait photographing mode.

Furthermore, according to the present exemplary embodiment, the user is notified of the exposure time to be employed in photographing by the exposure time which is displayed on the display unit 106. However, it is not limited thereto, and the user may also be notified by other methods such as a voice, as long as the user can recognize the exposure time.

According to the second exemplary embodiment, the configuration illustrated in FIG. 1 and the photographing sequence illustrated in FIG. 2A are similar to those of the first exemplary embodiment. The difference from the first exemplary embodiment is the photographing order for photographing three types of images in the starry sky-portrait photographing mode. This is illustrated in a "second exemplary embodiment" row illustrated in FIG. 3.

More specifically, according to the second exemplary embodiment, the first photographed image is obtained by performing step C, the second photographed image is obtained by performing step B, and the third photographed image is obtained by performing step A. Steps A, B, and C correspond to the steps described according to the first exemplary embodiment. Further, according to the present exemplary embodiment, when the user is operating on the SW1, the display unit 106 displays the sum of the exposure times for obtaining the first to the third photographed image, i.e., 2T1+T2. An effect similar to the first exemplary embodiment can thus be obtained.

On the other hand, according to the present exemplary embodiment, the photographing conditions for obtaining the first photographed image are greatly different from those of the first exemplary embodiment. As a result, the following difference is generated.

According to the first exemplary embodiment, the first photographed image is obtained employing the short exposure time T1 while firing the flash. The second photographed image is then obtained employing the short exposure time T1 without firing the flash, and the third photographed image is obtained employing the long exposure time T2 without firing the flash.

In contrast, according to the present exemplary embodiment, the first photographed image is obtained employing the long exposure time T2 without firing the flash. The second photographed image is obtained employing the short exposure time T1 without firing the flash, and the third photographed image is obtained employing the short exposure time T1 while firing the flash.

In other words, according to the first exemplary embodiment, the time from when the flash is fired to when photographing ends in the starry sky-portrait photographing mode is 2T1+T2. On the other hand, according to the present exemplary embodiment, the time from when the flash is fired to when photographing ends in the starry sky-portrait photographing mode is T1, which is much shorter than that of the first exemplary embodiment.

When the object is a person, the person psychologically tends to determine that photographing has ended when flash firing has ended. If the person then moves according to such determination, a blurred image is obtained. According to the first exemplary embodiment, the time from when the flash is fired to when photographing ends is 2T1+T2 and thus long, so that such a failed image is likely to be obtained.

On the other hand, according to the present exemplary embodiment, photographing ends in the short time T1 after firing the flash by only changing the photographing order of the three types of combined images. It thus greatly reduces the possibility of obtaining a blurred image as described above.

<Imaging and Photographing>

According to the present exemplary embodiment, "photographing" indicates a series of operations from imaging performed by the user pressing SW2 to recording the image obtained by performing imaging.

The above-described exemplary embodiments are applicable to an arbitrary device in which the imaging apparatus is built in, or which externally connects to the imaging apparatus, other than a device (e.g., the digital camera) of which the main objective is to take a photograph. Examples of such a device is a mobile phone, a PC (a laptop type, a desktop type, and a tablet type), and a game console. The "imaging apparatus" according to the present invention thus includes arbitrary electronic devices having an imaging function.

Aspects of the present invention generally reduce unsuccessful photographing due to a camera shake or the movement of the object in the imaging apparatus which continuously captures a plurality of images of different exposures.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171637 filed Aug. 21, 2013, which is hereby incorporated by reference herein in its entirety.

What is claimed is:

1. An imaging apparatus including an imaging device configured to obtain a plurality of photographed images of different photographing conditions, the imaging apparatus comprising:
at least one processor; and
at least one memory containing a program that causes the at least one processor to perform a process comprising:
setting photographing conditions of the imaging device;
instructing photographing by the imaging device; and
notifying photographing conditions set by the setting before instructing the photographing,
wherein only a photographing condition of a longest exposure time from among a plurality of photographing conditions for obtaining the plurality of photographed images is notified before instructing the photographing.

2. The imaging apparatus according to claim 1, further comprising an image processor configured to perform image processing on the plurality of photographed images and generate one processed image.

3. The imaging apparatus according to claim 2, wherein the at least one processor is further configured to add to the one processed image, photographing conditions as supplementary information, wherein the supplementary information includes a photographing condition of a photographed image with a longest exposure time from among the plurality of photographed images.

4. The imaging apparatus according to claim 1, wherein notification of the photographing conditions occurs by displaying the photographing conditions.

5. The imaging apparatus according to claim 1, wherein the at least one processor is further configured to control the imaging device to obtain one of the plurality of photographed images by performing imaging employing an exposure time T1 when a light emitter is emitting light, one of the plurality of photographed images by performing imaging employing the exposure time T1 when the light emitter is not emitting light, and one of the plurality of photographed images by performing imaging employing an exposure time T2 which is longer than T1 when the light emitter is not emitting light.

6. The imaging apparatus according to claim 1, wherein the at least one processor is further configured to control the imaging device to obtain one of the plurality of photographed images by performing imaging employing an exposure time T2 when a light emitter is not emitting light, one of the plurality of photographed images by performing imaging employing an exposure time T1 which is shorter than T2 when the light emitter is not emitting light, and one of the plurality of photographed images by performing imaging employing the exposure time T1 when the light emitter is emitting light.

7. The imaging apparatus according to claim 1, wherein the at least one processor is further configured to control the imaging device to obtain one of the plurality of photographed images by performing imaging employing an exposure time T1, and one of the plurality of photographed images by performing imaging employing an exposure time T2 which is longer than T1.

8. The imaging apparatus according to claim 1, wherein the at least one processor is further configured to generate a composite image by compositing the plurality of images.

9. A control method of an imaging apparatus including an imaging device configured to obtain a plurality of photographed images of different photographing conditions, the control method comprising:
- setting photographing conditions of the imaging device;
- instructing photographing by the imaging device; and
- notifying the set photographing conditions before instructing the photographing,
- wherein only a photographing condition of a longest exposure time from among a plurality of photographing conditions for obtaining the plurality of photographed images is notified before instructing the photographing.

10. The control method according to claim 9, further comprising performing image processing on the plurality of photographed images and generating one processed image.

11. The control method according to claim 10, further comprising adding to the one processed image, photographing conditions as supplementary information, wherein the supplementary information includes a photographing condition of a photographed image with a longest exposure time from among the plurality of photographed images.

12. The control method according to claim 9, wherein notification of the photographing conditions occurs by displaying the photographing conditions.

13. The control method according to claim 9, further comprising controlling the imaging device to obtain one of the plurality of photographed images by performing imaging employing an exposure time T1 when a light emitter is emitting light, one of the plurality of photographed images by performing imaging employing the exposure time T1 when the light emitter is not emitting light, and one of the plurality of photographed images by performing imaging employing an exposure time T2 which is longer than T1 when the light emitter is not emitting light.

14. The control method according to claim 9, further comprising controlling the imaging device to obtain one of the plurality of photographed images by performing imaging employing an exposure time T2 when a light emitter is not emitting light, one of the plurality of photographed images by performing imaging employing an exposure time T1 which is shorter than T2 when the light emitter is not emitting light, and one of the plurality of photographed images by performing imaging employing the exposure time T1 when the light emitter is emitting light.

15. The control method according to claim 9, further comprising controlling the imaging device to obtain one of the plurality of photographed images by performing imaging employing an exposure time T1, and one of the plurality of photographed images by performing imaging employing an exposure time T2 which is longer than T1.

16. The control method according to claim 9, further comprising generating a composite image by compositing the plurality of images.

17. A non-transitory computer-readable storage medium storing computer executable instructions for causing a computer to implement a method, the method comprising:
- setting photographing conditions of an imaging device;
- instructing photographing by the imaging device; and
- notifying the set photographing conditions before instructing the photographing,
- wherein only a photographing condition of a longest exposure time from among a plurality of photographing conditions for obtaining the plurality of photographed images is notified before instructing the photographing.

* * * * *